May 21, 1940.  A. O. McCOLLUM  2,201,782
VALVE
Filed June 25, 1938
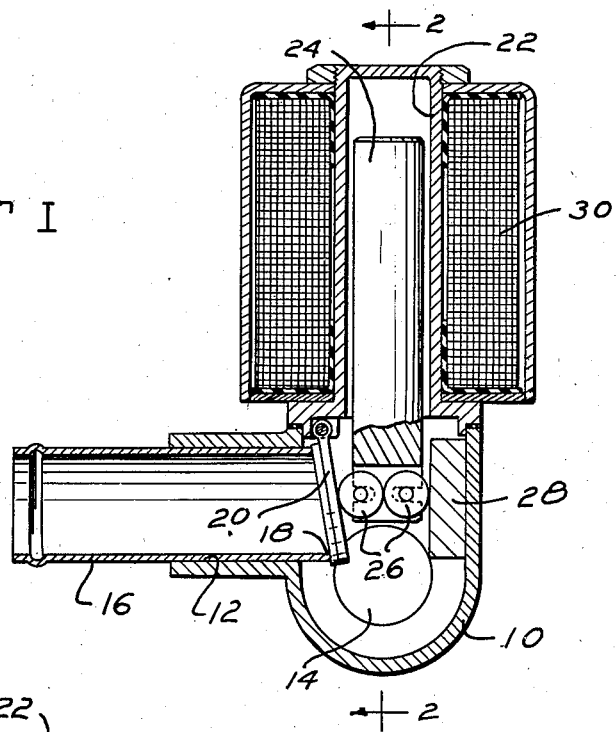
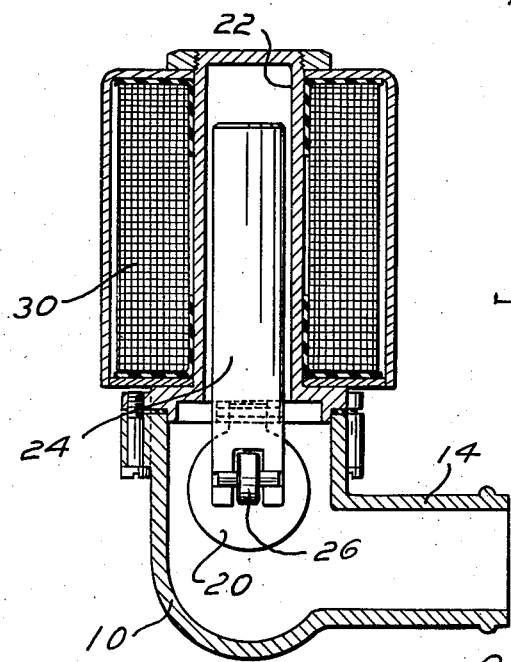
INVENTOR.
ANDREW O. McCOLLUM
BY
McConkey Dawson & Booth
ATTORNEYS.

Patented May 21, 1940

2,201,782

UNITED STATES PATENT OFFICE 2,201,782

VALVE

Andrew O. McCollum, Detroit, Mich., assignor to Bendix Home Appliances, Inc., South Bend, Ind., a corporation of Delaware Application June 25, 1938, Serial No. 215,717

4 Claims. (Cl. 137—139)

This invention relates to valves and more particularly to electrically-controlled drain valves.

One of the objects of the invention is to provide a valve which offers a clear passage for a stream of liquid with the least possible danger of clogging.

Another object of the invention is to provide a valve in which the seat is kept clean to insure proper closing.

Another object of the invention is to provide a valve including simple and efficient operating mechanism which is readily adapted for remote control. According to one feature of the invention the valve includes electrical control means which may readily be controlled through switches at a point remote from the valve.

Other objects, advantages and novel features of the invention will be apparent from the following description of the accompanying drawing, in which:

Figure 1 is a section with parts in elevation of a valve embodying the invention; and Figure 2 is a section on the line 2—2 of Figure 1.

The invention is illustrated on the drawing as being embodied in a drain valve for an automatic washing machine although it will be understood that it might be embodied equally well in valves for many other purposes. As shown, the valve includes a hollow body 10, preferably of cast zinc or zinc alloy, having an inlet opening 12 and an integral outlet tube 14. An inlet tube 16 extends horizontally through the inlet opening and terminates in a circular valve seat 18 lying in a plane at an acute angle to the vertical.

The seat is adapted to be closed by a valve disc 20 pivoted in the body just above the valve seat 18. If desired the disc 20 may be faced with rubber or the like to provide a tight seal against the valve seat.

In order to operate the valve disc the body 10 is formed with a vertical tubular extension 22 in which a core or armature 24 of magnetizable material is movable. The core 24 carries at its lower end a pair of rollers 26 engageable respectively with the valve disc 20 and with a vertical flat surface projection 28 in the body opposite and at an acute angle to the valve seat. As the core moves downwardly under the influence of gravity the rollers 26 engage the valve disc 20 and projection 28 and wedge the valve disc tightly against the valve seat 18 to close the inlet tube 16.

The core 24 is raised by means of a solenoid coil 30 around the extension 22 and controlled by suitable manual or automatic switches, not shown. When the solenoid is energized the core 24 will be raised and the valve disc 20 can move away from its seat under the influence of pressure in the tube 16.

With this arrangement liquid may have a substantially unobstructed flow through the valve and since all of the liquid sweeps across the valve seat it will be kept free so that clogging will be prevented and so that the disc will seat properly at all times.

While only one embodiment of the invention has been shown and described in detail, it will be understood that numerous changes might be made therein and it is not intended to limit the scope of the invention to the exact form shown nor otherwise than by the terms of the appended claims.

What is claimed is:

1. A valve comprising a hollow body formed with inlet and outlet openings, an inlet tube extending into said body and terminating in a circular valve seat, a valve member pivotally mounted in said body and movable into sealing position on said seat, a substantially flat surfaced projection in the body spaced from and at an acute angle to the seat, and an operating member movable across the seat and having rollers engageable with the projection and the valve member to wedge the valve member against the seat.

2. A valve comprising a hollow body formed with inlet and outlet openings and a closed tubular extension and having a circular valve seat at the inner end of the inlet opening, a valve disc pivotally mounted in the body and engageable with said seat to close the inlet opening, a flat surfaced projection in the body at an angle to the valve seat, a core movable vertically in said tubular extension and having one end provided with rollers engageable with the projection and the valve disc to wedge the valve disc into engagement with the seat, said core being movable downward by gravity to close the valve, and a solenoid coil around the extension to raise the core whereby the vale can open.

3. A valve comprising a hollow body formed with inlet and outlet openings and having a tubular extension, an inlet tube extending into the body through the inlet opening and terminating in a circular valve seat, a valve disc pivotally mounted in said body at one side of the valve seat and swingable into sealing engagement with the valve seat to close the inlet tube, a projection spaced from and forming an acute angle with the valve seat, and an operating member movable across the valve seat from said one side and having rollers engageable with the valve disc and the projection to wedge the valve disc into engagement with the seat.

4. A valve comprising a hollow body formed with inlet and outlet openings and having a valve seat at the inner end of the inlet opening, a valve disc pivotally mounted in said body at one side of the valve seat and swingable into sealing engagement with the valve seat to close the inlet opening, a projection spaced from and forming an acute angle with the valve seat, and an operating member movable across the valve seat from said one side and having rollers engageable with the valve disc and the projection to wedge the valve disc into engagement with the seat.

ANDREW O. McCOLLUM.